US009047537B2

(12) United States Patent
Hunt, Jr.

(10) Patent No.: US 9,047,537 B2
(45) Date of Patent: Jun. 2, 2015

(54) PRIORITIZED CONTACT TRANSPORT STREAM

(71) Applicant: Prioria Robotics, Inc., Gainesville, FL (US)

(72) Inventor: Walter Lee Hunt, Jr., Gainesville, FL (US)

(73) Assignee: Prioria Robotics, Inc., Gainesville, FL (US)

( * ) Notice: Subject to any disclaimer, the term of this patent is extended or adjusted under 35 U.S.C. 154(b) by 238 days.

(21) Appl. No.: 13/724,557

(22) Filed: Dec. 21, 2012

(65) Prior Publication Data

US 2013/0163816 A1 Jun. 27, 2013

Related U.S. Application Data

(60) Provisional application No. 61/580,067, filed on Dec. 23, 2011.

(51) Int. Cl.
*G06K 9/00* (2006.01)
*G06K 9/62* (2006.01)

(52) U.S. Cl.
CPC .......... *G06K 9/6267* (2013.01); *G06K 9/00771* (2013.01)

(58) Field of Classification Search
CPC .. G06K 9/00624; G06K 9/00771; G06T 9/00; G06T 9/001; G06T 2207/30232; H04N 19/10; H04N 19/102; H04N 19/127; H04N 19/189; H04N 19/20; H04N 19/85; H04N 19/90; H04N 21/84
USPC ............... 382/100, 103, 232; 348/143, 399.1, 348/425.1, 425.3, 426.1; 725/144, 145, 725/146; 710/29, 40, 41, 42, 44
See application file for complete search history.

(56) References Cited

U.S. PATENT DOCUMENTS

| | | | | |
|---|---|---|---|---|
| 6,829,391 | B2 | 12/2004 | Comaniciu et al. | 382/243 |
| 7,430,335 | B2 | 9/2008 | Dumitras et al. | 382/260 |
| 2008/0168512 | A1 | 7/2008 | Nguyen | 725/105 |
| 2008/0252723 | A1 | 10/2008 | Park | 348/143 |
| 2009/0116688 | A1 | 5/2009 | Monacos et al. | 382/100 |

*Primary Examiner* — Andrew W Johns
(74) *Attorney, Agent, or Firm* — Robert Plotkin, P.C.

(57) ABSTRACT

A detection process, contact recognition process, classification process, and identification process are applied to raw sensor data to produce an identified contact record set containing one or more identified contact records. A prioritization process is applied to the identified contact record set to assign a contact priority to each contact record in the identified contact record set. Data are removed from the contact records in the identified contact record set based on the contact priorities assigned to those contact records. A first contact stream is produced from the resulting contact records. The first contact stream is streamed in a contact transport stream. The contact transport stream may include and stream additional contact streams. The contact transport stream may be varied dynamically over time based on parameters such as available bandwidth, contact priority, presence/absence of contacts, system state, and configuration parameters.

64 Claims, 11 Drawing Sheets

PAST STATE 304
104a CUR FRAME(S)
902
308a PAST FRAMES
804
104b CUR SAMPLES
CLASSIFICATION PROCESS
CONTACT RECORD SET (NEW-B)
308b PAST SAMPLES
904 PAST CONTACT RECORD SETS
310 CONTACT RECORD SET (NEW-A)

PRIORITIZED CONTACT TRANSPORT STREAM

CROSS-REFERENCE TO RELATED APPLICATIONS

This application claims priority from U.S. Prov. Pat. App. Ser. No. 61/580,067, filed on Dec. 23, 2011, entitled, "Autonomous Range Monitoring System," which is hereby incorporated by reference herein.

STATEMENT AS TO FEDERALLY SPONSORED RESEARCH

This invention was made with Government support under contract NNX09CE64P, awarded by NASA. The Government has certain rights in the invention.

BACKGROUND

General-purpose sensing systems have a wide variety of uses. Of particular interest is a subclass of sensing systems which perform a function known as "range monitoring." Range monitoring systems utilize a "range monitoring sensor suite" consisting of one or more sensors of varying type and function specialized for the purpose of monitoring a static or mobile spatial region of interest (ROI) for the presence of objects (physical entities in the environment in which there is some interest). Parameters describing the "environmental state" of the ROI can optionally be monitored. "Range monitoring" can be defined as "detection, classification, identification, tracking, and reporting/recording of objects-of-interest within a fixed or mobile spatial region-of-interest, optionally supplemented with environmental information." This contrasts with an "environmental monitoring system", where direct sensing of environmental state parameters is the primary goal of the system.

SUMMARY

A detection process, contact recognition process, classification process, and identification process are applied to raw sensor data to produce an identified contact record set containing one or more identified contact records. A prioritization process is applied to the identified contact record set to assign a contact priority to each contact record in the identified contact record set. Data are removed from the contact records in the identified contact record set based on the contact priorities assigned to those contact records. A first contact stream is produced from the resulting contact records. The first contact stream is streamed in a contact transport stream. The contact transport stream may include and stream additional contact streams. The contact transport stream may be varied dynamically over time based on parameters such as available bandwidth, contact priority, presence/absence of contacts, system state, and configuration parameters.

DETAILED DESCRIPTION

Figure 1:
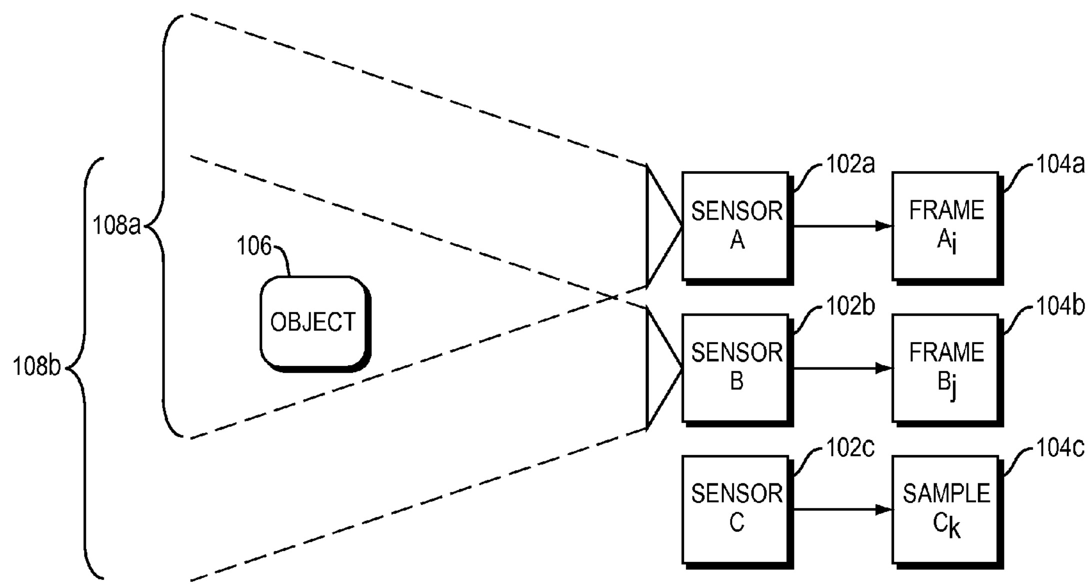
FIG. 1 illustrates a sensor sampling process that may occur in a sensor delivery agent.

Embodiments of the present invention include, for example, methods for data reduction and transmission of data corresponding to objects-of-interest from an embedded sensing system to a remote receiving station.

"Autonomous and unmanned systems" (AUS) of all types are trending towards increased use as components in range monitoring systems. For ease of explanation, an AUS will be described herein as performing the function delivering sensors to the ROI. An AUS may, however, be used for other purposes in a range monitoring system (e.g., as a communication relay). The remainder of this specification will refer to an AUS which delivers sensors to an ROI for range monitoring as a sensor delivery agent, or "agent" for short.

Advancements in sensor miniaturization in conjunction with new sensing technologies have enabled current "small", "micro", and "nano" class AUS to function as sensor delivery agents while collecting unprecedented quantities of raw data in real-time onboard the unmanned system. As used herein, the term "real-time" includes streaming and processing of data "within the data flow" rather than archiving and processing of data "after the fact". As used herein, the term "streaming" refers to any transmission of a stream of data, in which a first element of the stream is delivered in a manner suitable for consuming the first element of the stream while one or more subsequent elements of the stream are being transmitted. In other words, when a data set is streamed, it is not necessary for the receiver of the data set to receive the data set in its entirety before consuming (e.g., analyzing, rendering, or otherwise processing) at least part of the received data set.

The growth rate of the quantity of real-time raw sensor data available onboard the agent is far outpacing the growth rate of capacity of the wireless data link used for offboard communications. Furthermore, current methods for streaming raw sensor data are strongly rooted in and derived from video; raw data from some types of new sensors (e.g., multispectral cameras) do not natively correspond to formatting requirements of the streaming video model. As a result, it is simply not possible for a sensor delivery agent with a current suite of high data-rate sensors to share all of its real-time raw data with the system operator or other agents. Furthermore, new range monitoring operational concepts along with recent reductions in the cost of both sensors and sensor delivery agents have led to a need for a single (human) operator to manage multiple agents simultaneously, with each agent providing access to information from a full suite of onboard sensors. This need exacerbates the bandwidth problem for individual agents.

This situation, in which a single operator is responsible for simultaneous operation of multiple agents and real-time monitoring of streaming data from the system, is referred to as "single operator, multi-agent" operation herein.

Current autonomous systems are capable of advanced navigation given pre-defined paths and rudimentary autonomous control of sensors (e.g., pointing a gimbaled camera at a predetermined coordinate). Advanced forms of navigation and sensor control due to onboard processing of raw sensor data are well established at this time and many can be used with range monitoring systems. However, human-equivalent dynamic decision making, control, and situational awareness based on non-specialized, evolving, "real-world" scenarios and data are not currently technically feasible and may not be so for decades. Furthermore, ethical concerns will restrict certain decision-making steps to remain human-only for the foreseeable future (e.g. a "kill" decision process in a weaponized range monitoring system). The lack of a technical need for human-equivalent analysis and interpretation of sensor data as well as ethical considerations will force humans to remain "in-the-loop" as the ultimate top-level decision makers for many range monitoring decision-making processes for the foreseeable future. However, the increase in quantity of data produced by current sensor suites employed on sensor delivery agents significantly increases the complexity of top-level management and decision-making for the human operator. Embodiments of the present invention utilize the output of well-known classes of algorithms in a novel way to prioritize and filter raw data and to generate a novel type of data stream such that per-agent data link utilization, command and control overhead, and human monitoring overhead ("human bandwidth") are significantly decreased compared to existing state of the art. Compared to existing state of the art, embodiments of the present invention provide the following benefits: 1) support single-operator, multi-agent control on a previously unprecedented scale, 2) experience minimal degradation of operational capability in a communication-denied environment, 3) enable access to data of interest on the ground in data formats that are not available with current technology, 4) limit the resource cost associated with information and data extraneous to the function of the system. Detailed descriptions of these benefits along with a technical description of the invention will now be provided.

The term "object," as used herein, refers to a physical entity of interest in the environment of the sensor. The definition of an object may vary from situation to situation, as defined by a specific range monitoring application in a particular situation. A specific range monitoring application may, for example, define objects as people, vehicles, animals, or crates. A range monitoring application to protect a military facility might define "object" to be people and vehicles, while a traffic checkpoint might only be interested in vehicles. A wildlife monitoring application might define objects as animals (or animals of a certain species).

A wide variety of unmanned systems may be utilized as sensor delivery agents in a range monitoring system. In general, a sensor delivery agent may be mobile or fixed and may be of any size. Agents may be space-based, airborne, ground-based, or water-based (surface or subsurface). Examples of potential space-based sensor delivery agents are satellites or unmanned spacecraft such as the X-37B. An airborne agent might be an unmanned aerial vehicle (UAV), tethered aerostat, or high-altitude airship. A ground-based agent might be an unmanned ground vehicle (UGV) or sensor package mounted to the ground or a structure. A water-based agent might be a buoy, unmanned surface vehicle (USV), or unmanned underwater vehicle (UUV). Other types of sensor delivery agent are possible; the exemplary list is not exhaustive.

One distinguishing characteristic of a "modern" multi-agent range monitoring system for which embodiments of the present invention provide benefits is the ability of sensor delivery agents to acquire more raw sensor data than is possible to transmit wirelessly in real time. In general, the term "sensor" refers to a physical sensing device on-board an agent, either with or without a field-of-view (FOV). Sensors without a FOV may, for example, be either directional or non-directional. An example of a sensor with a FOV is a traditional video camera. An example of a sensor without a FOV that is directional is a laser range finder; a non-directional example is a GPS sensor. The native output data structure for sensors having a FOV is called a frame. Physically, a frame is a two or more dimensional array of data representing the sensed quantity or quantities in the FOV acquired over a sampling time window (e.g., exposure). The data format of a raw frame is specific to the type of sensor. An example of a frame is an RGB image from a traditional camera. Conversely, a sample is a single set of data values representing the sensed quantity or quantities of a sensor without a FOV, acquired instantly or over a sampling time window. The sample data is in the native format output by the sensor, which is most often a binary integer format. Note that a sample may consist of multiple data fields; for example, a GPS sample can consist of latitude, longitude, altitude, and UTC time.

Although the quantitative data capacity of a communication link varies greatly with the nature of the sensor delivery agent and the operational environment, many current sensors can easily overwhelm a current wireless data link. As an example, consider a high-resolution CCD or CMOS imaging device present in high-quality electro-optic cameras. Currently a top-of-the-line device may be physically capable of delivering raw data at 30+ frames per second, with 12+ bits per color channel and 5+ megapixel resolution. The raw data output rate of the bare sensor is in general limited only by the circuitry, and is an order of magnitude or more greater than even the best wireless link. A non-exhaustive exemplary list of high-rate sensors that may be included onboard one or more sensor delivery agents includes but is not limited to multi- and hyperspectral optical imagers, high-resolution electro-optic (EO) sensors, low-light electro-optic imagers (EMCCD), thermal imaging long-wavelength infrared (LWIR) optical sensors, short-wavelength infrared (SWIR) optical sensors, low-light optical sensors, and synthetic aperture radar (SAR) sensors. Due to the massive amounts of raw data produced by each of these sensor types, the wireless data link between the onboard sensors and the offboard control station is unable to transmit the data from these sensors without first removing information. A practical example is a wide area airborne surveillance (WAAS) system, which utilizes a persistent airborne platform as the sensor delivery vehicle and many onboard cameras, such that it produces many orders of magnitude more video data than can be transmitted offboard with any existing data link technology.

Transport stream technology is critical to the ability of a range monitoring system to provide live information to the offboard system and the system operator. In general, a "transport stream" (TS) is a generic stream specialized to transport both data and metadata over lossy links. An example of a transport stream that is well known to those of ordinary skill in the art is a MPEG-2 TS. These streams are used to send both streaming video and generic metadata where the video frames and metadata are encoded as packets. Current transport stream standards (including the MPEG-2 TS) are heavily evolved from the television industry and are strongly adapted for motion video. The term "legacy transport stream," as used herein, refers to a transport stream containing one or more video streams of raw or processed video and one or more metadata streams. An example is a video stream encoded according to NATO STANAG 4609, using an MPEG-2 transport stream with MPEG-2 compression and KLV metadata fields. The full metadata dictionary supported by this standard is defined in SMPTE RP210. The state of the art for standardized metadata fields used by unmanned systems is defined in MISB engineering guideline EG 0801.2 and MISB standard STD 0601.5.

The legacy transport stream is representative of the state of the art in current streaming technology. The applicable engineering guidelines (e.g. UAS Datalink Local Metadata Set, MISB STD 0601.5) support the notion of a target only through metadata referencing a location within a video data stream. Recent inventions enable those of ordinary skill in the art to develop engineering guidelines suitable to adapt a legacy transport stream technology to transmit a region-of-interest in a source video corresponding to a manually designated object-of-interest in the scene. However, the state of the art does not provide any guidance for down-selecting (i.e., filtering) or transmitting data corresponding to a contact or contact group in a manner that does not map efficiently to the paradigm of RGB video (e.g. when the sequence of frames transmitted cannot effectively be played-back in sequence as a video). Additionally, the state of the art provides no guidance for constructing a transport stream capable of supporting contact record metadata from a classification or identification process. Furthermore, contact priority metadata is not supported.

Embodiments of the present invention utilize onboard automated detection, classification, and/or identification processes to identify data and metadata of interest where such correspond to objects-of-interest in the agent's environment. First, a detection process and optional classification and identification processes are executed. Any detection, classification, and identification processes may be used, such as any of the well-known processes described in the literature. The output of these processes is a metadata record (referred to herein as a "contact record set") storing derived information about known objects (referred to herein as "contacts") and information relating each known object to corresponding raw sensor data.

Embodiments of the present invention utilize the derived object metadata to filter and prioritize metadata records such that only objects with priorities above some minimum threshold priority are considered for allocation of further resources (including transmission bandwidth and human bandwidth). Next, embodiments of the present invention down-select (i.e., filter) a subset of the raw sensor data corresponding to the objects-of-interest in the environment, according to the priority assigned to each object. Embodiments of the present invention then assemble and transmit a custom transport stream containing select data and metadata corresponding to the prioritized objects. Distinguishing features of this custom transport stream include that it: 1) minimizes extraneous data content, 2) enables priority-based allocation of both channel and human bandwidth, and 3) enables transmission of custom non-video data structures to improve the utilization of sensor data and technology not efficiently corresponding to the paradigm of live video.

Embodiments of the present invention enable a sensor delivery agent to generate a content-based transport stream containing video and non-video data in addition to specialized metadata. In general, the objective of a sensor delivery agent utilized for range monitoring is to enable detection, classification, and identification of physical objects-of-interest in the environment as well as general surveillance and reconnaissance of the objects-of-interest. FIG. 1 shows an example of the sensor sampling process of the type that may occur in a sensor delivery agent. This figure shows three sensors 102*a* ("Sensor A"), 102*b* ("Sensor B"), and 102*c* ("Sensor C"), producing "frame" or "sample" outputs 104*a* ("Frame $A_i$"), 104*b* ("Frame $B_j$"), and 104*c* ("Frame $C_k$"), respectively. In this example, a single object 106 is present in the environment. The sensors 102*a-c* in the drawing represent physical sensor devices on an embedded platform with a field-of-view (in the case of sensor 102*a*, with field-of-view 108*a*, and sensor 102*b*, with field-of-view 108*b*) or without a field-of-view (in the case of sensor 102*c*). Sensors with a field-of-view output an array of synchronously (or near-synchronously) sampled data. Sensors without a field-of-view output a single data sample. Sensors without a field-of-view may be directional or non-directional, while sensors with a field-of-view are always directional. The output of a sensor with a field-of-view is called a frame. A frame is an array of data representing the sensed quantity or quantities in the environment within the sensor's field-of-view, acquired over a sampling time window (e.g. exposure). The native format of the frame data is specific to each physical sensor. A sample is a single set of data values representing the sensed quantity or quantities of a sensor without a field-of-view, acquired instantly or over a sampling time window. The sample data is in the native format output by the sensor, and may be a record containing multiple data fields. Examples of what might constitute the physical object include but are not limited to a car, person, animal, and crate. An exemplary sensor with a field-of-view is a camera, and a laser range finder is a directional example without a field-of-view. A GPS sensor is an example of a non-directional sensor without a field-of-view. An example of a frame is an RGB image from a camera sensor. An example of a sample is a record containing latitude, longitude, and altitude data from a GPS sensor.

A "detection process" is a set of steps that recognize the presence of object(s) within the field-of-view of one or more sensors. In general, detection processes can be autonomous (e.g., performed by an algorithm) or manual (e.g., performed by a human). Embodiments of the present invention utilize an autonomous detection process performed by an agent to detect objects. A "detection" is a metadata record that is produced as the output of a detection process. It represents a single object within the field-of-view of a single sensor. A detection set is the set of all detections provided by a detection process for a single set of inputs. Multiple different objects may be represented as detections in the set. Additionally, a single object can be represented as multiple detections in the detection set if the object is within the field-of-view of multiple sensors. Finally, the detection set may be empty if no objects are within the field-of-view of any sensors on the sensor delivery agent.

Figure 2:
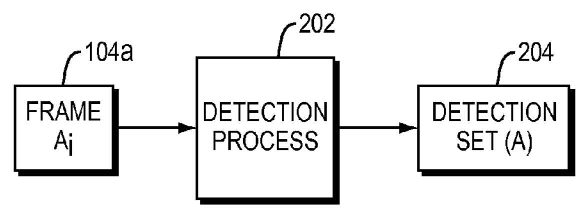
FIG. 2 shows the inputs and output of a simple exemplary detection process in a case in which only one frame from a sensor is used as an input.
Figure 3:
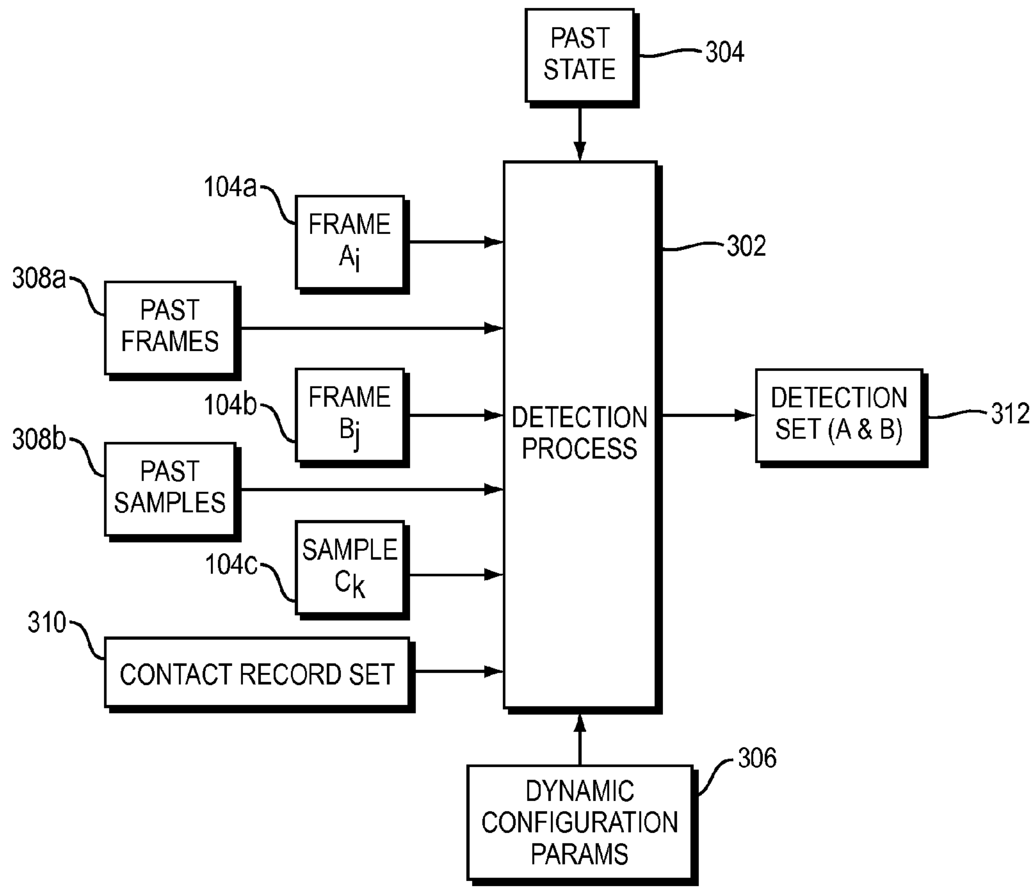
FIG. 3 shows a more complex exemplary detection process.

FIG. 2 shows the inputs and output of an exemplary detection process 202 (referenced to the exemplary configuration of FIG. 1) if only one frame 104*a* from sensor 102*a* were utilized as input. The output of this example is a detection set 204 containing a single detection from sensor 102*a*. The important takeaway from this example is that useful automated detection processes exist utilizing only the current frame and implicit (design-time) configuration parameters. However, more complicated detection processes can also exist. FIG. 3 shows another example detection process 302 utilizing past state of the agent 304, dynamic configuration parameters 306, a "current" frame from each of sensors 102*a* and 102*b* (i.e., frames 104*a* and 104*b*, respectively), "past" frames 308*a* from sensors 102*a* and 102*b*, a "current" sample 104*c* from sensor 102*c*, "past" samples 308*b* from sensor 102*c*, and the contact record set 310 (which will be defined in detail later herein). With this complicated detection process 302 (and the configuration of FIG. 1), the detection set output 312 from the detection process 302 contains two detections: one from sensor 102*a* and the other from sensor 102*b*.

Embodiments of the present invention may be configured by one of ordinary skill in the art to use any known detection process. Alternately, an expert with requisite skill could invent a new detection process (with implementing algorithms) specialized for the needs of a current or new range monitoring application. Specific detection processes and algorithms are well known to those of ordinary skill in the art. Readers should note that variations in terminology exist with respect to autonomous detection technology. One of ordinary skill in the art will be able to understand the necessary concepts and apply detection technology published with different jargon to the present invention.

Figure 4:
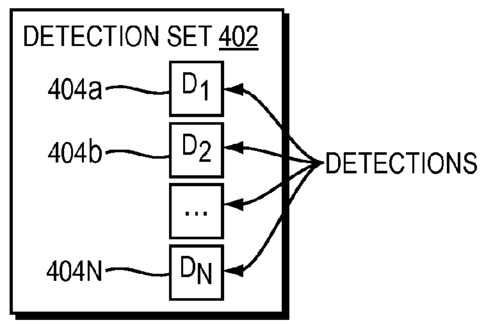
FIG. 4 shows the contents of an example detection set.
Figure 5:
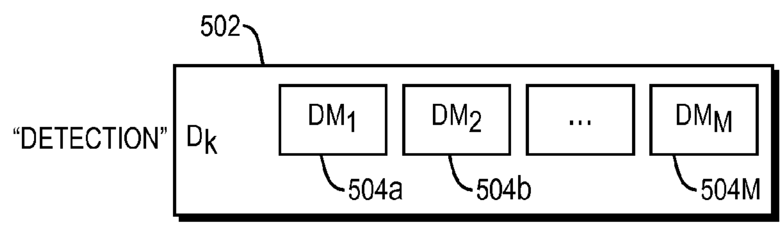
FIG. 5 shows the contents of an example detection.

FIG. 4 shows in more detail the contents of a detection set 402 consisting of N detections 404*a*-N. Each of the detections 404*a*-N consists of detection metadata. "Detection metadata" provides information about the individual detections 404*a*-N. Valid detections must contain a minimal set of detection metadata; the set of metadata in a single detection cannot be empty. The detection Dk 502 in FIG. 5 is shown with M detection metadata fields 504*a*-M. There are no explicitly required detection metadata types, however, the minimal set of detection metadata must contain information about 1) which sensor performed the detection, 2) where the detection is within the projected sensor FOV, 3) some notion of size and/or shape of the detection relatable to the projected sensor coordinate space, and 4) timing information allowing the detection to be connected to the raw data frame which sourced it. Some form of absolute timestamp common to all sensors in the platform is of great use but not explicitly required. An absolute universal time (e.g., UTC from GPS) is also useful but not required. The set of metadata types does not need to be the same for all detections in the detection set (e.g., detections 404*a*-N in detection set 402). An example of a metadata field describing the sensor performing the detection is a string name. The location of the detection within the sensor field-of-view might be specified (for a traditional camera) with metadata providing a 2-D coordinate on the image plane. The size/shape might be specified with a metadata field containing a scalar dimension in the image plane coordinate space (e.g., side of a bounding box or radius of a bounding circle). Timing information relating the detection to the source frame might be a metadata field containing a counter, a reference to frame buffer data, or even an absolute time in UTC format. The optimal representation depends on the system implementation. The examples provided do not represent all possibilities for detection metadata.

A "contact" is an object in the environment which is known to the system. The detection set represents a snapshot of everything that might represent a "new contact," or one which has entered the field-of-view of at least one sensor. Other types of contact can also be defined. A "current contact" resides within the field-of-view of at least one sensor. A contact that leaves the field-of-view of all sensors for an appreciable amount of time becomes a "lost contact." A lost contact that re-enters the field-of-view of any sensor and can be recognized as a previously known contact becomes a "reacquired contact." In embodiments of the present invention, a contact is an object which has autonomously been detected by an embodiment of the present invention. For range monitoring applications, sensor data corresponding to contacts is of inherently greater value than data that does not correspond to any object of interest. In this context, "correspond" refers to data that is directly of the contact, but it can also refer to data which adds context to the contact in some way. For images, corresponding data may include, for example, pixels for the contact and the immediate surroundings. In general, corresponding data is defined as data useful for detection, classification, identification, surveillance, or reconnaissance activities/processes by a human or machine. More details on the process for selecting corresponding data will be provided later in this specification.

A "contact record" is an information record for a single contact containing, at a minimum, all detection metadata pertaining to that object for all sensors in which it is visible. However, the most useful contact record contains more than just detection metadata; in practice, metadata derived from any other sensor or computational process which can be correlated in some way with the contact can be included. The most common example of contact record metadata beyond that produced by the detection process is tracking metadata. Tracking metadata provides information on the contact's position history. Position history may, for example, be in a sensor-specific projected coordinate space, a relative Euclidian space, or a world-coordinate space. Future position history predictions are useful but not required. A contact record containing tracking metadata is also called a "track." Likewise, a contact for which the contact record contains tracking metadata is called a "target." The process of "target tracking" (which is known to those of ordinary skill in the art) attempts to maintain the track while maneuvering the sensor and platform to keep the target within a sensor field-of-view. The target tracking process is an example of a useful process for a range monitoring system with derived metadata outputs that can become part of a contact record. This example should allow one of ordinary skill in the art to recognize metadata from other specialized processes which can be correlated with a contact and could therefore be included in a contact record.

Figure 6:
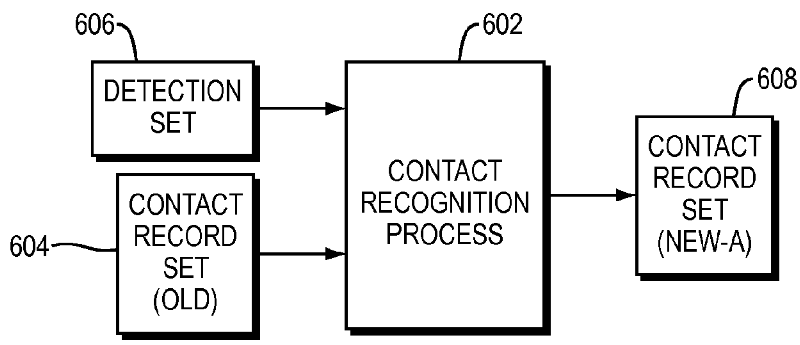
FIG. 6 shows the inputs and outputs of an exemplary contact recognition process.
Figure 7:
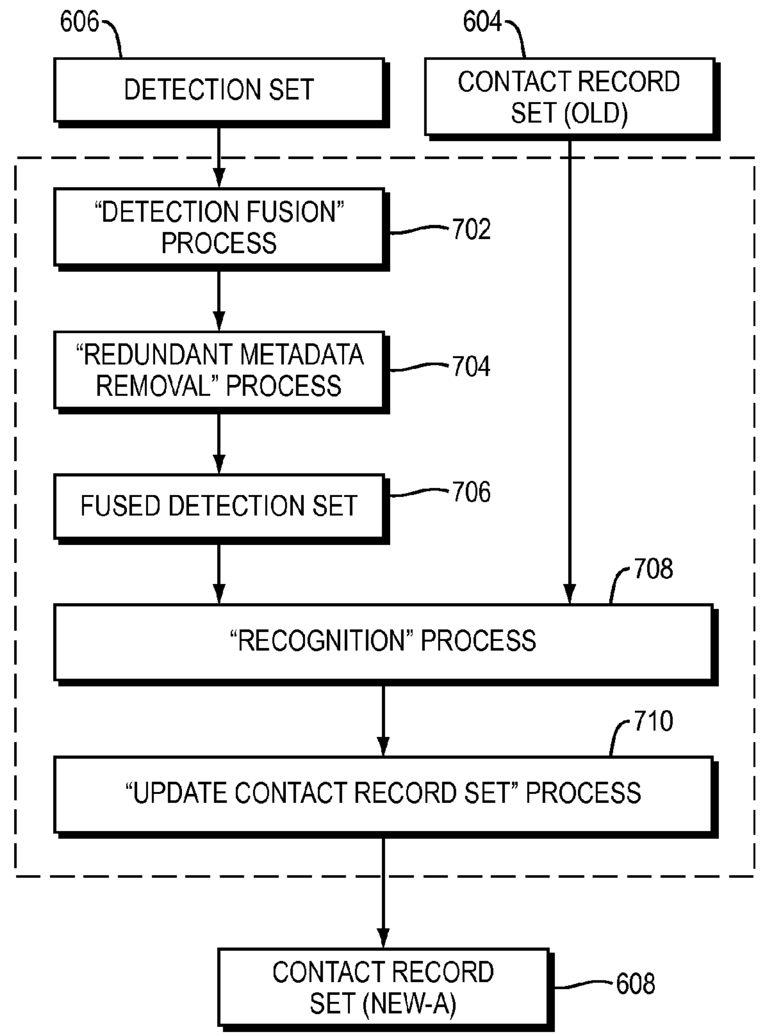
FIG. 7 shows the inputs and outputs of an exemplary contact recognition process.

The "contact record set" is the set of all contact records for objects known to the system. This set persists over time and can be modified by additional autonomous processes as well as manual interaction by a human. A "contact recognition process" is the process by which new contact records are assembled and integrated from detections in the most recent detection set. The inputs and outputs for this process are shown in FIG. 6. The previous ("old") contact record set stores all contact records prior to the most recent detection set. In general, all contact recognition processes will fuse detections in the detection set which are for the same object into a single record. All processes will also remove redundant detection metadata for fused records. Additionally, all types of detection process will compare the detection results with the "old" contact record set to correlate the detection metadata with new, reacquired, or current contacts, and initial contact records for new contacts are generated. Optionally, a contact recognition process may initially tag a new contact record as "pending new" until multiple subsequent detections of the same object occur and/or additional metadata confirming the detection can be derived. The contact recognition process is completed by adding new (or pending new) contact records to the set for new contacts, updating the state of newly reacquired contacts from lost to current, and integrating as necessary detection metadata not already part of a contact record (for, perhaps, a new sensor). Detections in the detection set corresponding to current contacts do not create a new entry. An example of steps that might constitute a contact recognition process is shown in FIG. 7. In the example of FIG. 7, metadata from the detection set is first combined in a detection fusion process. Next, redundant metadata is removed by a redundant metadata removal process 704 to produce a fused detection set 706. Next, a recognition process 708 correlates objects represented in the detection set 606 with known contacts, and a process 710 to update the contact record set 604 adds new contacts to the contact record set 604 and updates state metadata in the contact record set 604 as necessary, thereby producing contact record set 608. (This example does not include support for pending new contacts). One of ordinary skill in the art should be able to tailor other existing contact recognition process technologies to correspond with this description such that it is usable with embodiments of the present invention.

Note that metadata fields within the contact record sets 604 and 608 are not necessarily final and unchanging. Some metadata fields may not update synchronously with respect to the frame, and others may be generated through separate processes with asynchronous timing. An example of potentially useful contact record metadata is vision-based object motion state estimation metadata. Many other examples are possible.

Figure 8:
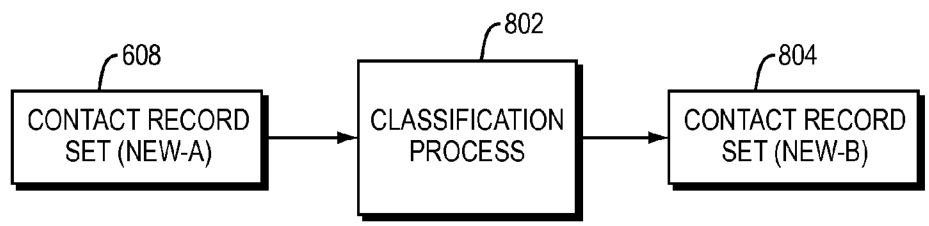
FIG. 8 shows the inputs and outputs of a simple classification process.
Figure 9:
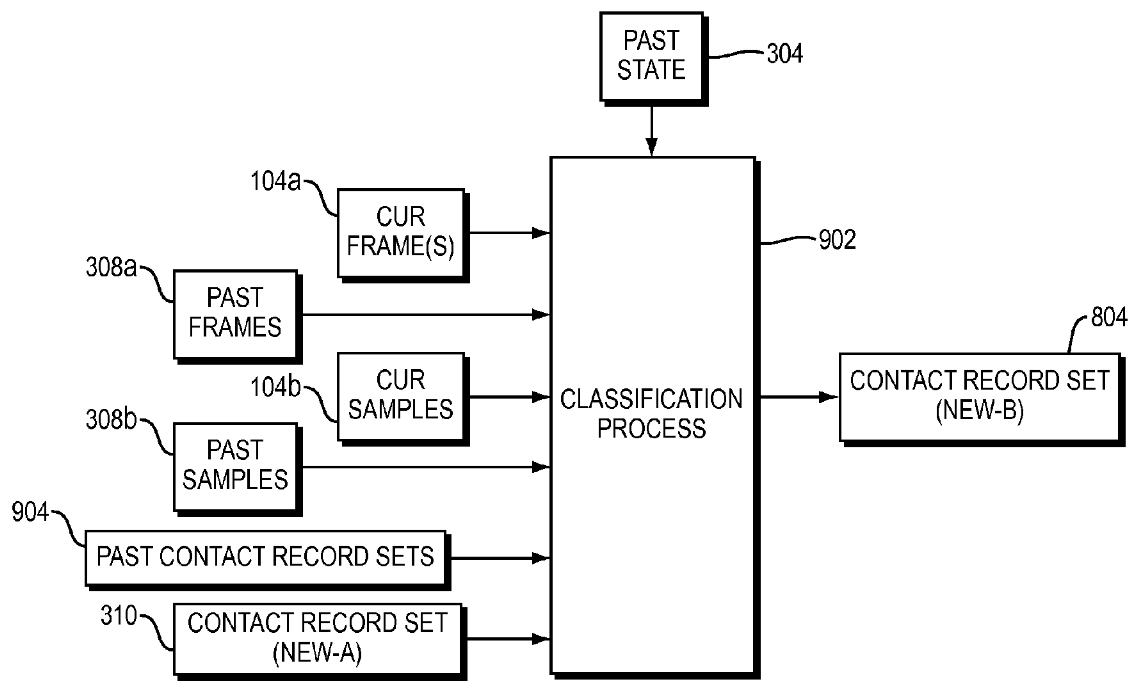
FIG. 9 shows the inputs and outputs of a more complex exemplary classification process.
Figure 10:
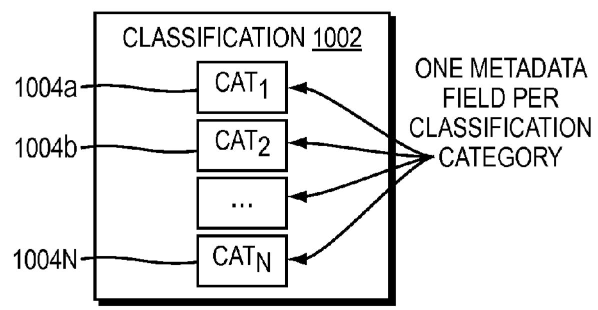
FIG. 10 shows an exemplary classification.

Embodiments of the present invention use a contact record set with records containing the minimal set of detection metadata. However, metadata from additional (optional) autonomous post-detection processes can be useful. A "classification process" is a set of steps which assign labels to a contact designating the contact as a member of a predefined class in one or more classification categories. When used as a noun, a "classification" is a metadata record that specifies the derived class of the contact in each classification category. As shown in FIG. 10, such a metadata record 1002 contains one metadata field for each of a plurality of classification categories. In the particular example of FIG. 10, the classification 1002 contains N metadata fields 1004*a*-N as an example, The interaction of a generic classification process with its inputs and outputs is shown in FIG. 8 for a simple classification process 802 and in FIG. 9 for a complicated classification process 902, both of which are within the scope of embodiments of the present invention. Although it is possible for classifications to be made based only on the contact record set 608 (as shown in FIG. 8), derivation of metadata fields for most useful classification categories will additionally require frame data and sample data (e.g., frame data 104*a* and 308*a* and sample data 104*b* and 308*b* in FIG. 9). Furthermore, the classification process 902 of FIG. 9 also receives as input and takes into account past contact record sets 904. The output of classification processes implemented according to embodiments of the present invention (such as classification processes 802 and 902) is a contact record set 804 with classification metadata, referred to herein as a "classified contact record set." Classification processes and classification metadata are an area of active research and are well known to those of ordinary skill in the art.

Figure 11:
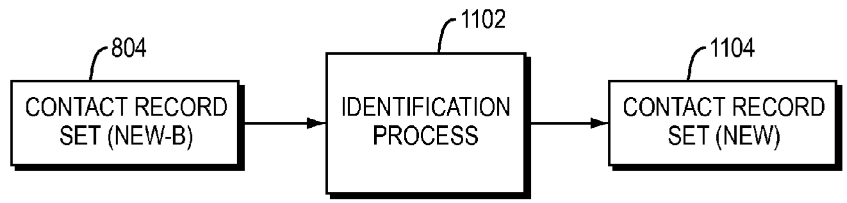
FIG. 11 shows the inputs and outputs of a simple identification process.
Figure 12:
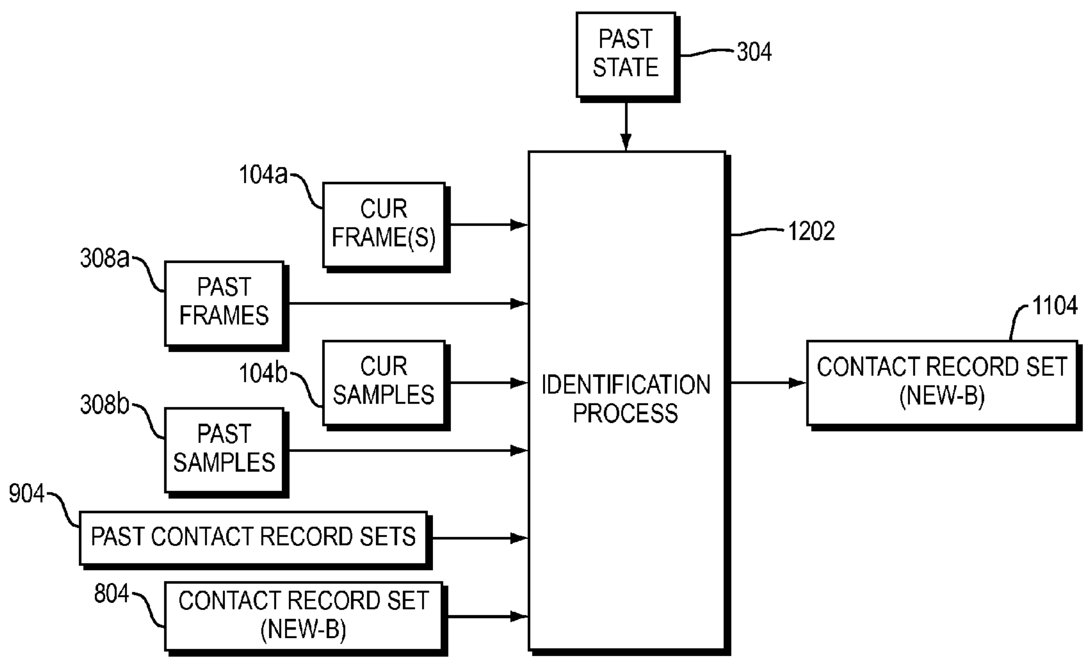
FIG. 12 shows the inputs and outputs of a more complex identification process.

An "identification process" is a set of steps that assign metadata to a contact designating specific information about the contact that cannot be efficiently expressed with a classification category. A NULL set output is allowed in general since conclusive identification of every contact is not possible for all types of identification information. The information discovered by this process can be as specific as a unique identification. When used as a noun, an "identification" is a metadata record containing non-null identification information. The interaction of a generic identification process with its inputs and outputs is shown in FIG. 11 for a simple identification process 1102 and in FIG. 12 for a complicated classification process 1202, both are within the scope of embodiments of the present invention. Although it is technically possible for an identification to be made based only on the contents of the contact record set 804 (as shown in FIG. 11), the complexity of current identification algorithms makes this unlikely to be useful in practice. Therefore, as shown in the identification process 1202 of FIG. 12, an identification process may receive as input and take into account frame data and sample data (e.g., frame data 104*a* and 308*a* and sample data 104*b* and 308*b*) and past contact record sets 904. The output of identification processes that implanted according to embodiments of the present invention (such as identification processes 1102 and 1202) is a contact record set 1104 with identification metadata, referred to herein as an "identified contact record set." Identification processes and identification metadata are known to those of ordinary skill in the art.

Figure 13:
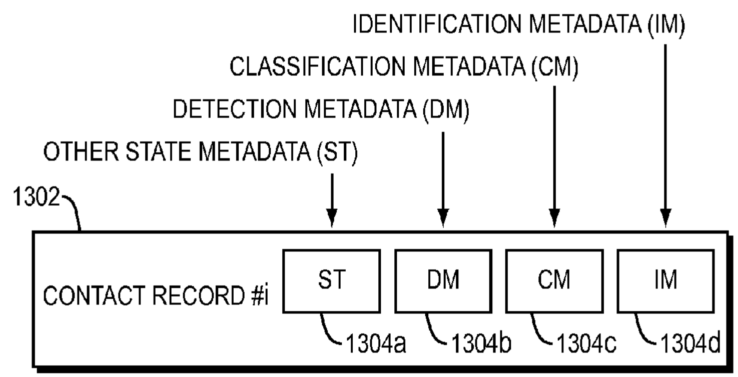
FIG. 13 shows an exemplary contact record.

A graphical representation of a contact record 1302 (record #i in the contact record set) is shown in FIG. 13. This contact record 1302 contains detection metadata 1304*b*, classification metadata 1304*c*, identification metadata 1304*d*, and other derived state metadata 1304*a*. Contact records utilized by embodiments of the present invention must have detection metadata 1304*b*. The other types of metadata 1304*a*, 1304*c*, and 1304*b* in the graphical representation of FIG. 13 are optional. Identification metadata 1304*d* is highly useful; however, the reliability and complexity of these algorithms makes implementation difficulty increase substantially on small form-factor systems due to SWAP (size, weight, and power) hardware constraints. Unique identifications are much more difficult to perform than non-unique identifications. Note that the terms "classification" and "identification" are not consistently used in related literature; they may have overlapping meanings with respect to how they are defined here. The explicit definitions of these terms and the examples included herein will clarify the proper meaning of these terms as used in this specification, to one of ordinary skill in the art.

Figure 14:
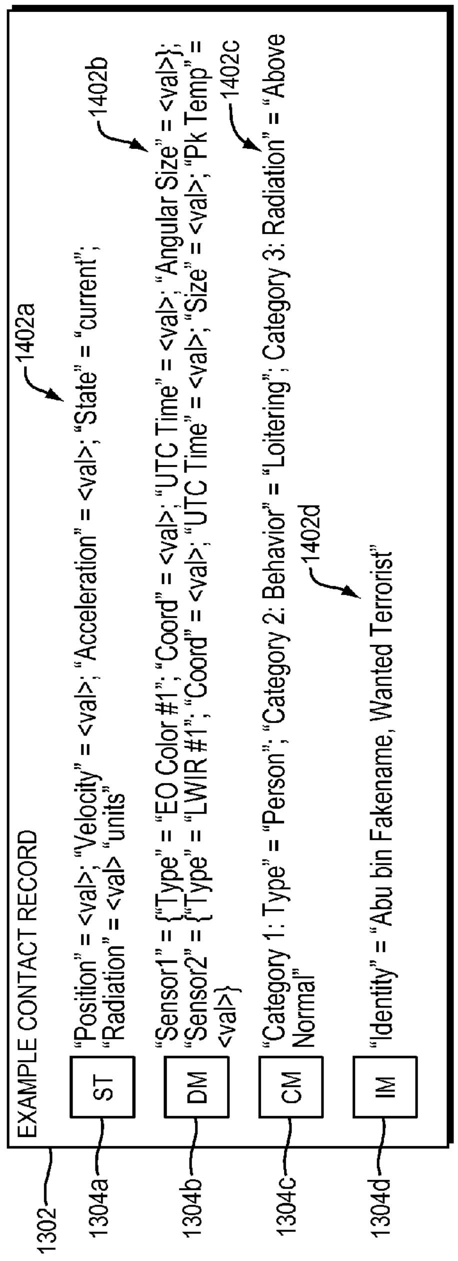
FIG. 14 shows first exemplary contents of the contact record of FIG. 13.

FIG. 14 shows an example of the contents of contact record 1302, as may be utilized as input to embodiments of the present invention. In particular, FIG. 14 shows example contents 1402*a* of state metadata 1304*a*; contents 1402*b* of detection metadata 1304*b*; contents 1402*c* of classification metadata 1304*c*; and contents 1402*d* of identification metadata 1304*d*. The values 1402*a* of the other state metadata fields 1304*a* may be derived from additional processes which should be evident to those of ordinary skill in the art. The contents 1402*a* of other derived state metadata 1304*a* in the example of FIG. 14 contains quantitative information on position, velocity, acceleration, the contact state (i.e., pending new/new/current/reacquired/lost), and ambient radiation. (The radiation metadata value would come from non-directional radiation sensors on-board the agent). The contents

1402*b* of the detection metadata 1304*b* corresponds to the guidelines provided earlier in this specification. In particular, the detection metadata example contents 1402*b* include data from two sensors ("Sensor1" and "Sensor2") in the manner of fused detection metadata. The "Type" field designates the name and nature of the sensor such that pre-flight calibration and dynamic pose information for the sensor can be accessed and utilized, and so that the appropriate frame buffer can be referenced. The "Coord" fields specify the location of the contact in the field-of-view of the sensor known as "EO Color #1" and the sensor known as "LWIR #1". Both sensors provide absolute timing information in the "UTC Time" field which can be used in conjunction with the frame buffer to specify the exact source frame data. The "Sensor1" record specifies the size of the contact as an angular size, implying that an intrinsic camera calibration allowing conversion to pixel size units is known for this sensor. Conversely, for exemplary reasons the "Sensor2" record specifies the apparent size of the object directly in pixel units (e.g. "Size"). Finally, the detection metadata for the contact record of FIG. 14 contains an additional field named "Pk Temp" for "Sensor2", which reports the peak temperature of the contact (an LWIR sensor is thermal infrared and can be used to measure temperature).

The contents 1402*c* of the classification metadata 1304*c* in the example of FIG. 14 includes three classification categories: "Type", "Behavior", and "Radiation". The names of these categories are arbitrarily chosen for the example. The "Type" category has a present value of "Person" and might (for example) have "Vehicle" and "Other" as additional possible values. The "Behavior" category has a present value of "Loitering" and might (for example) have "Moving Slow" and "Moving Fast" as additional possible values. (Note that the quantitative state which produces a certain classification can be dependent on another classification value; for example, a slow moving jet aircraft would still be much faster than a slow moving person). The final classification metadata category in this example is "Radiation" and has a present value of "Above Normal". This value would be assigned based on the output of a classification process designed to consider current radiation data and/or previous data from a radiation history. Note that metadata field histories are not shown in the example, but would also be part of the contact record if they were present.

Finally, the contents 1402*d* of the identification metadata 1304*d* in the example of FIG. 14 includes an arbitrarily named identification category "Identify" with the value "Firstname Lastname, Wanted Terrorist". This is a unique identification which is difficult with current identification technology; however, the information provided by this identification is obviously of use.

Figure 15:
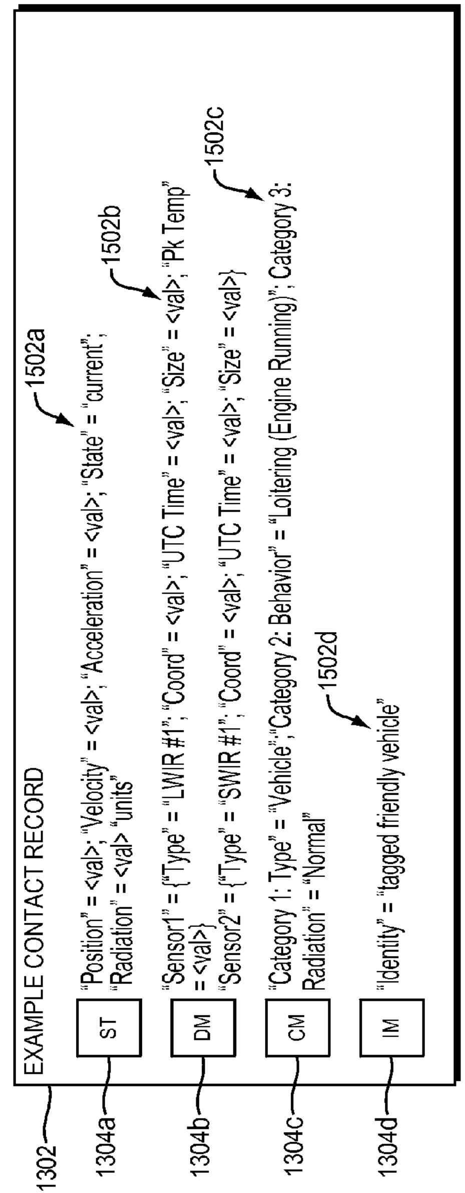
FIG. 15 shows second exemplary contents of the contact record of FIG. 13.

A second example of the contents of contact record 1302 is shown in FIG. 15. In particular, FIG. 15 shows example contents 1502*a* of state metadata 1304*a*; contents 1502*b* of detection metadata 1304*b*; contents 1502*c* of classification metadata 1304*c*; and contents 1502*d* of identification metadata 1304*d*. This second example utilizes a different sensor set (LWIR #1 and SWIR #1) as can be seen from the contents 1502*b* of the detection metadata 1304*b*. The classification category "Type" (in contents 1502*c*) has a present value of "Vehicle" and the "Behavior" field has a present value of "Loitering (Engine Running)". (The state of a vehicle engine can be determined by thermal imaging.) In this example, the classification category "Radiation" has a present value of "Normal". The identification category "Identity" has a present value of "tagged friendly vehicle" (in contents 1502*d*). (Note that "tagged vehicle" refers to the process of chemically tagging a vehicle by splashing or painting a mark on it that is only visible to certain sensors, and many taggant chemicals are invisible to human eyes but visible to a SWIR camera.) This is an example of a non-unique identification if a NULL output is possible from the source algorithm. If the source algorithm were capable of multiple other outputs including a generic "unrecognized" option, then this could also be considered a classification category rather than an identification category.

Figure 16:
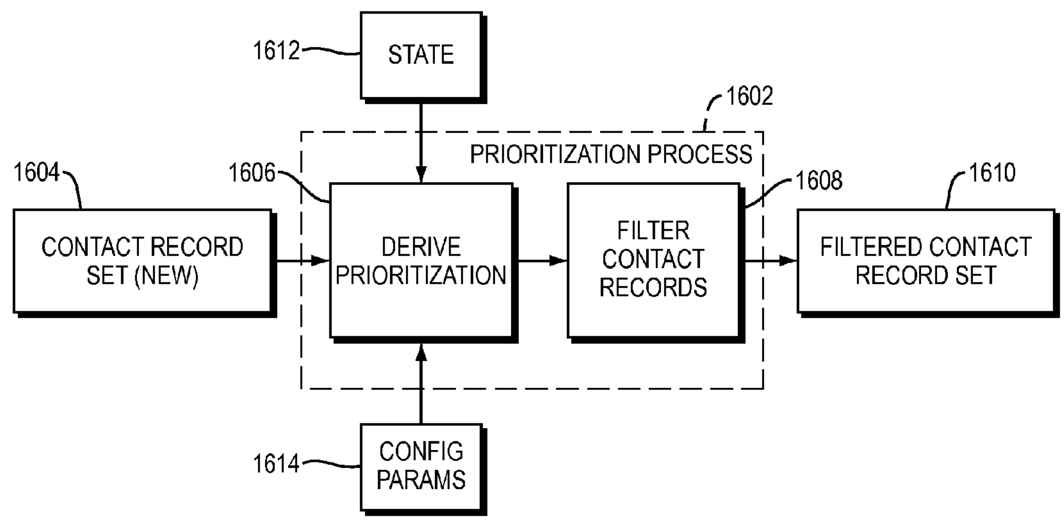
FIG. 16 shows an exemplary prioritization process.

The contents of a contact record set (such as any one or more of contact record set 310, contact record set 604, contact record set 608, contact record set 804, and contact record set 1104) may be used by embodiments of the present invention. Therefore, any reference below to "the contact record set" should be understood to refer to any of the contact record sets disclosed herein. In one embodiment, the contact record set is filtered and prioritized according to the needs of the mission. A "contact priority" is a rating (such as a quantitative and/or qualitative rating) assessing the importance of allocating data link bandwidth to the sensor data associated with the contact. Examples of qualitative priorities are "keep" and "discard," while examples of quantitative priorities are numbers (e.g., 0, 1, 2, 3). The contact priority may be used by embodiments of the present invention to down-select (i.e., filter) sensor data and metadata for transmission according to the needs of the system and, for example, to block extraneous data from utilizing data link bandwidth (even if bandwidth is available). This important capability has the benefit of minimizing the amount of extraneous information transmitted downstream, which reduces the human bandwidth required to monitor the system. A "filtered contact record set" is a set where each contact record includes one or more metadata fields representing the contact priority. Furthermore, the filtered contact record set has been filtered according to these contact priority metadata fields such that any contact records not having a priority that satisfies some applicable criteria (e.g., exceeding a minimum threshold priority) are removed. A "prioritization process," such as the prioritization process shown in FIG. 16, is a two-step process that receives a contact record set 1604 (such as any of the contact record sets disclosed herein) as input and: (1) assigns 1606 a contact priority to individual contact records in the contact record set 1604 and (2) filters 1608 the contact record set 1604 according to the priority to produce a filtered contact record set 1610. System state metadata 1612 and static/dynamic configuration parameters 1614 are optional inputs to the prioritization process 1602.

Selection of the contact priority metadata fields, the algorithm to derive the contact priority values, and the algorithm to filter the contact record set according to the contact priority metadata are highly application specific. However, in general, the contact priority metadata values may be derived from some combination of the contact record metadata, state metadata, and configuration parameters. The combination of these values does not have to be linear, and it is not required that all available contact record metadata be used. Select contact record fields may be used as control fields to alter the behavior of the priority derivation algorithm. Finally, the priorities of individual contact records can be affected by metadata from other contact records.

A simple example should clarify the nature of the process and allow it to be customized for specific applications by those of ordinary skill in the art. The simplest possible contact priority metadata contains a single field with a binary value interpreted as "keep" or "discard". In this case, the priority is qualitative; however, one of ordinary skill in the art should have the skill required to implement a quantitative process according to the guidelines described herein. The filtered contact record set 1610 in this example would contain all contact priorities with a qualitative priority of "keep". However, options for data down-selection (i.e., filtering) using this example of contact priority metadata are limited. A more complex and more useful example of contact priority metadata consists of a qualitative priority tier assignment and a quantitative numeric priority assessment within the tier. A number of advantages are offered by this example which will be detailed later in this specification.

TABLE 1

| Algorithm | "Keep" Criteria |
|---|---|
| 1 | Keep all contacts. |
| 2 | Keep all people or vehicle contacts. |
| 3 | Keep all loitering contacts. |
| 4 | Keep all loitering contacts, keep all speeding vehicles, and keep all running people. |
| 5 | Keep all idling or moving vehicles. |
| 6 | Keep all contacts when radiation is 'above normal'; otherwise, keep all loitering or speeding vehicles. |
| 7 | Keep all identified contacts and keep all contacts within a specified proximity of an identified contact. |
| 8 | Keep all contacts which are not security personnel. |
| 9 | Keep all contacts which have persisted longer than a specified time period. |
| 10 | Keep all contacts with intersecting projected paths. |
| 11 | Keep all contacts with projected paths intersecting a predefined spatial region. |
| 12 | Keep all contacts within a predefined spatial region with projected paths intersecting a second predefined spatial region. |
| 13 | Keep all contacts with a derived metric greater than a threshold, and keep all identified contacts. |
| 14 | Keep all contacts when the sensor deliver agent is in a heightened awareness search mode. |

A wide variety of algorithms are possible to produce the quantitative contact priority metadata from the simple example in the previous paragraph. A subset of algorithms is detailed in Table 1 as an example. The first example is trivial and is worthy of additional commentary. Algorithm #1 is a trivial process by which no additional information is added to the contact record set and no filtration of the set is performed.

Finally, the filtered contact record set 1610 produced by the prioritization process 1602 will contain zero or more contacts, up to all contacts that are present in the contact record set 1604. This is because normal operation of the filter 1608 might elect to discard none, some, or all contact records under a specific set of operational circumstances. Furthermore, the filter 1608 included in the prioritization process 1602 does not in general remove metadata fields. The filter 1608 may, however, remove unused metadata fields during the prioritization process 1602. The use of metadata field filtering in the prioritization process 1602 would mainly be as an engineering optimization to save hardware resources.

Embodiments of the present invention next down-select (i.e., filter) data according to the contact priority metadata (contained within the filtered contact record set 1610), agent state 1612 and configuration settings 1614, and available link bandwidth. A "contact stream" is defined in this specification as an embedded stream containing select contact data and/or contact record metadata. A single contact stream may, for example, contain information (in the form of data or metadata) for one or more contacts. A "contact transport stream" is a transport stream containing one or more contact streams for transmission, e.g., transmission offboard the sensor delivery agent. Contact transport streams can support inclusion of legacy stream data/metadata for backwards compatibility.

Figure 17:
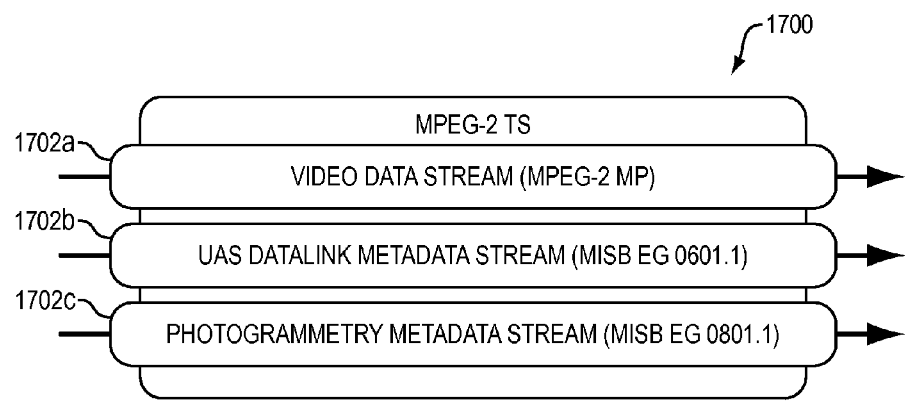
FIG. 17 shows a logical representation of a legacy transport stream.

An example of a legacy transport stream is useful to help illustrate the features of a contact transport stream. FIG. 17 is a logical representation of a legacy transport stream 1700 as a set of parallel virtual "pipes" 1702*a-c* for transmission of data and metadata. In this example, MPEG-2 TS is the container format for the transport stream 1700. The first virtual pipe 1702*a* in this example is a video data stream of MPEG-2 MP (medium profile) format. (Alternately, the video data stream could be encoded using H.264.) The second pipe 1702*b* in this example is a UAS data link metadata stream formatted as a key-length-value (KLV) stream according to MISB EG 0601.1. The third pipe 1702*c* in this example is a photogrammetry metadata stream formatted as a KLV stream according to MISB EG 0801.1. SMPTE 335M (Metadata Dictionary Structure), SMPTE 336M (Data Encoding Protocol Using Key-Length-Value), and SMPTE RP210.3 (SMPTE Metadata Dictionary Contents) are standards developed by the Society of Motion Picture and Television Engineers (SMPTE) to specify the mechanism for encoding metadata as KLV which is utilized by the cited MISB engineering guidelines.

The example legacy stream 1700 from FIG. 17 may be implemented using time-stamped packets according to the MPEG-2 TS specification. Each stream type is defined by a packet type. The graphic of FIG. 18 exemplifies the packet implementation for the legacy example transport stream 1700. Two packets 1802*a-b* are shown in the transport stream 1700 of FIG. 18; the first packet 1802*a* is an MPEG-2 video data packet, and the second packet 1802*b* is a UAS LDS Packet (MISB EG60101). Photogrammetry packets may also be included although they are not shown in FIG. 18.

Figure 18:
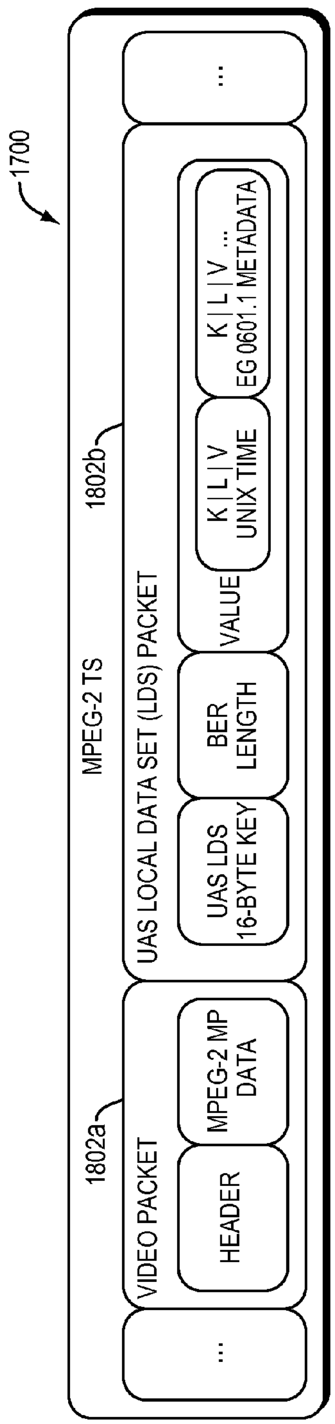
FIG. 18 shows an exemplary packet implementation of the legacy transport stream of FIG. 17.

The legacy transport stream 1700 of FIGS. 17-18 is representative of the state of the art in that the presented video data stream 1702*a* is constant. The stream 1702*a* is either 'on' or 'off', but frames transmitted in the stream 1702*a* are always of the same format and are intended for sequential display (as video). State of the art engineering guidelines do not support a notion of contacts. Furthermore, neither classification nor identification contact metadata are supported by the state of the art in the context of this specification. As a result, state of the art metadata streams cannot provide any useful information beyond ground position of the camera center without the video stream 1702*a*. Targeting marks other than on the optical axis are supported, but they are graphically embedded in the video stream 1702*a*; as a result, the metadata for these marks is meaningless without the video data 1702*a*.

Figure 19:
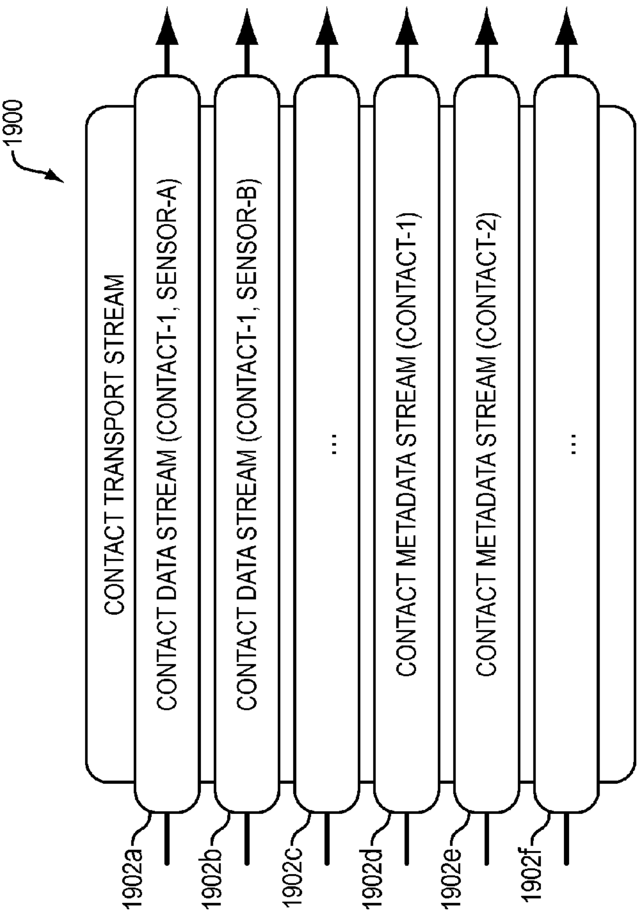
FIG. 19 shows an exemplary contact transport stream implemented according to one embodiment of the present invention.

Embodiments of the present invention introduce the notion of a contact transport stream to meet the shortcomings of the state of the art. A graphical representation of a contact transport stream 1900 as a set of parallel virtual pipes 1902*a-f* is shown in FIG. 19. In this figure, the contact transport stream 1900 contains multiple parallel contact streams 1902*a-f*. In FIG. 19, only two contact data streams 1902*a-b* are illustrated individually; any additional contact data stream(s) are illustrated collectively as stream 1902*c* for ease of illustration. Similarly, in FIG. 19, only two contact metadata streams 1902*d-e* are illustrated individually; any additional contact metadata stream(s) are illustrated collectively as stream 1902*f* for ease of illustration. In practice, the contact transport stream 1900 may include any number of contact data streams and any number of contact metadata streams.

Figure 20:
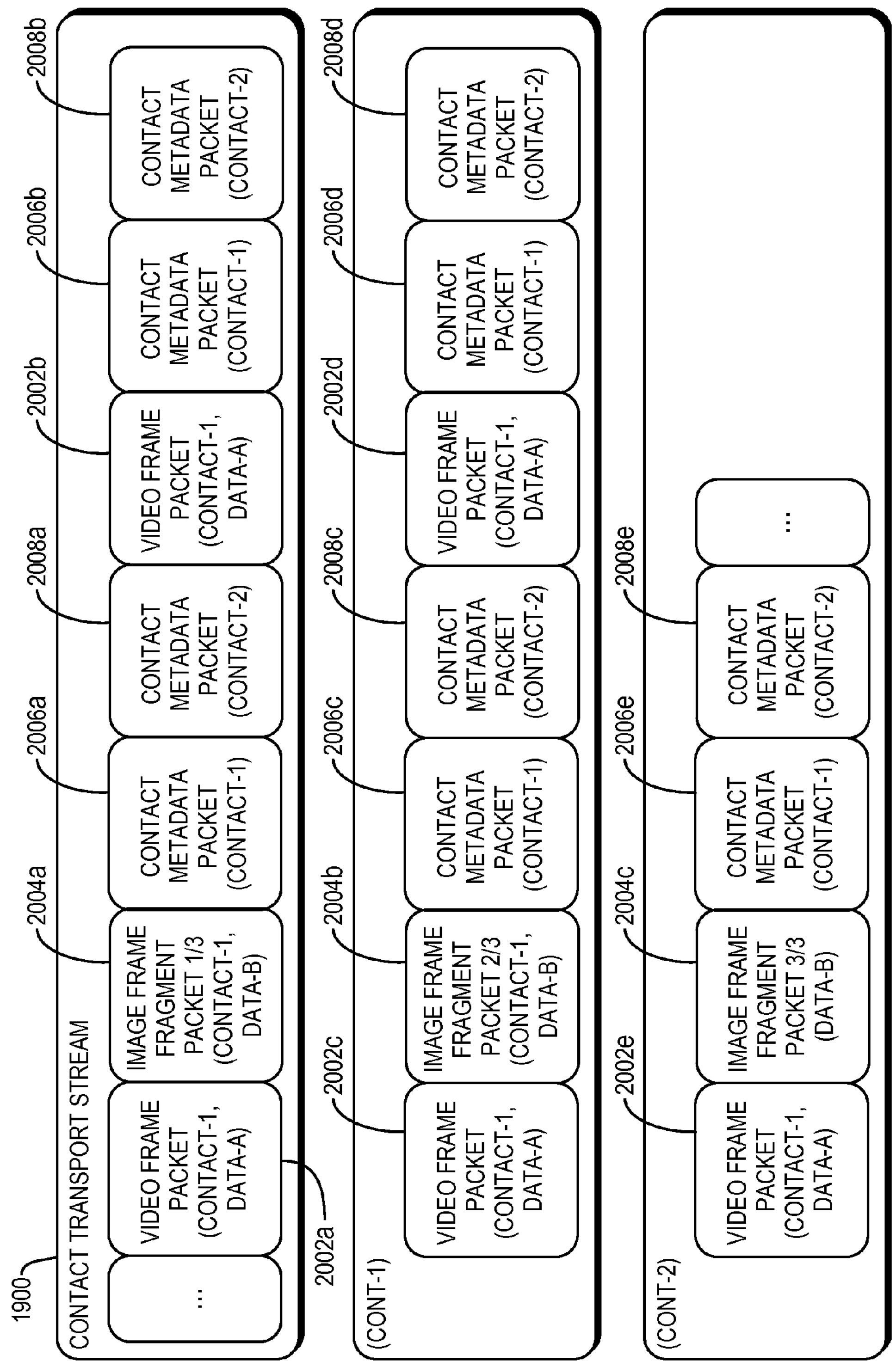
FIG. 20 shows an exemplary packet implementation of the transport stream of FIG. 19.

Each of the contact streams 1902*a-f* is associated with one or more contacts from the filtered contact record set 1610 previously defined herein. FIG. 20 shows how the contact transport stream 1900 of FIG. 19 may be constructed using a packet-based implementation like the commonly used MPEG-2 TS.

FIG. 20 shows how the contact transport stream 1900 from FIG. 19 may be implemented using packets. For the purposes of FIG. 20, "Data-A" is a video and "Data-B" is a fragment of a high-resolution image. The channel bandwidth in the example of FIG. 20 allows metadata from two contact records to be transmitted. In the example of FIG. 20, Data-A and Data-B might represent different views of the same contact/contact group, or they may be different views. Also, there is no guarantee that Data-A and Data-B contain information on both contacts; this would be determined by data bandwidth constraints and quantitative contact priorities (if available). As shown in the example of FIG. 20, video frame packets 2002*a-e*, image frame fragment packets 2004*a-c*, contact metadata packets 2006*a-e* for a first contact, and contact metadata packets 2008*a-e* for a second contact are interwoven with each other in the contact transport stream 1900.

In general, in embodiments of the present invention, a contact metadata stream is associated with exactly one contact, while a contact data stream may contain data for more than one contact and/or more than one sensor. Furthermore, in embodiments of the present invention, a contact data stream may contain data for a single contact in a single sensor, a single contact in multiple sensors, multiple contacts in a single sensor, or multiple contacts in multiple sensors. The data may be video or non-video. Because all contact data streams in embodiments of the present invention are associated with one or more contacts, a contact data stream cannot exist without both a sensor and a contact (and, implicitly, a contact record). This is a key difference with respect to the state of the art, where video and metadata streams require a sensor but can exist without a contact.

Furthermore, individual contact streams in embodiments of the present invention are excluded from the contact transport stream 1900 if the associated contact record is removed from the filtered contact record set 1610. Furthermore, in embodiments of the present invention, new contact streams may appear in the contact transport stream 1900 when new contacts are included in the filtered contact record set 1610. As a result, embodiments of the present invention may dynamically vary and adapt the composition of the contact transport stream 1900 over time, based on and in response to any one or more of the following, individually or in any combination: available bandwidth, contact priority (or priorities), presence/absence of contacts, system state, and configuration parameters. For example, embodiments of the present invention may vary the bandwidth utilized by a contact stream over time and dynamically by altering any one or more of the following, individually or in any combination, while streaming the contact stream: resolution, metadata content, metadata rate, frame rate, and image quality. A frame rate of zero is allowed and corresponds to removing video from the contact stream without restarting streaming of the stream. Furthermore, setting the metadata rate to zero corresponds to removing metadata from the contact stream without restarting streaming of the stream. In general, varying a parameter of a contact stream (such as any of the parameters just listed) "dynamically" refers herein to varying the parameter while the contact stream is being streamed. Dynamically varying a parameter of a contact stream, therefore, does not require stopping streaming of the contact stream, varying the parameter, and then re-starting streaming of the contact stream. As yet another example, embodiments of the present invention may dynamically add and/or remove contact streams from a contact transport stream, which means that a contact stream may be added to or removed from a contact transport stream while the contact transport stream is being streamed, i.e., without requiring streaming of the contact transport stream to be stopped before adding/removing the contact stream to/from the contact transport stream and then re-starting streaming of the contact transport stream. In contrast, state of the art legacy transport streams can vary the bit rate of the composing data streams, but they cannot dynamically add or remove composing streams based on a notion of a contact priority.

The process of creating the contact transport stream 1900 is a "contact transport stream assembly process." The contact transport stream assembly process is a process to construct a contact transport stream from raw or processed sensor data, filtered contact record metadata including contact priority metadata, and human-adjustable bandwidth and behavioral control parameters. Agent state information such as the current available channel bandwidth can also be utilized. The contact transport stream can contain contact streams for data and metadata. Streams contained in a legacy transport stream may also be included to supplement the system capability and for backwards compatibility, although these can be disabled manually or automatically to conserve bandwidth.

The assembly process for contact streams may be different for data and metadata streams. In one embodiment, the contact stream for data is assembled as follows. First, raw sensor data from a sensor having a FOV is selected for each contact according to the projection of an angular target region onto the sensor, where the angular target region is defined by the angular size of the target plus an angular buffer of zero or more degrees. The projection of the angular target region onto the sensor image plane may be any shape which is convenient. Examples of such shapes include squares, circles, ellipses, and irregular shapes. Data for contacts with close spatial proximity is merged into a single record if Euclidean position information is available for both contacts; otherwise, angular proximity within the field-of-view is used to trigger a merge. For multi-channel sensors, data is selected according to configuration parameters and/or sensor-aware design rules to maximize the capability of downstream detection, classification, identification, and general ISR processes. Next, the selected data is formatted such that it can be efficiently transmitted using a digital streaming protocol. (This may require spreading the data across multiple contact streams). Because the objective is the enabling of detection, classification, identification and general ISR capability, there is no need to use only resolutions, frame rates, and bit depths that are optimized for video consumption.

Furthermore, it is possible for a combination of control parameters and contact priority to designate the use of multiple contact streams to represent a single contact (or contact group). This may be accomplished by making different resolution, bit depth, and frame rate trade-offs in each contact stream such that different benefits are gained from each stream. For example, when the tiered contact priority example described earlier in this specification is utilized, the system may be configured such that tier-1 contacts are given priority for transmission bandwidth, thereby enabling contact streams containing video, high resolution imagery, and metadata. (As a particular example, a first contact data stream may be configured to emphasize resolution and bit depth at the expense of frame rate, while a second contact stream may be configured to provide lower quality at video rates.) Continuing this example, tier-2 contacts might be allocated bandwidth only for imagery and metadata, tier-3 contacts could be guaranteed bandwidth for metadata, and tier-4 contacts could be guaranteed no bandwidth but allowed to generate contact metadata streams if there is sufficient bandwidth.

Off-board processing or operator input may result in a dynamic reshuffling of contact priorities. For example, such reshuffling may occur as the result of receiving data received from multiple sensor delivery agents, and changing the priorities assigned to individual contacts as a result of the received data. For example, if two agents provide data indicating that a particular contact should be assigned a high priority, and a third agent provides data which does not indicate that the particular contact should be assigned a high priority, embodiments of the present invention may conclude that that the particular contact should be assigned a high priority and instruct the third agent to assign a high priority to the particular contact. In response, the third agent may assign a high priority to the particular contact. As another example, a human operator may provide user input specifying an updated contact priority for a particular contact. In response, embodiments of the present invention may assign the updated contact priority to the particular contact, and update the contact stream based on the updated contact priority. In this way, automatically-assigned priorities may be modified in response to manual input from human operators.

Embodiments of the present invention may create contact streams for data and metadata for all records in the filtered contact record set. Physical and imposed channel bandwidth constraints may, however, in practice, limit the subset of the raw data and metadata which can be included in the contact transport stream. As a result, it may not be possible to completely guarantee bandwidth for any contact stream. The contact transport stream assembly process may utilize the bandwidth allocation described in the previous example to assign bandwidth, but may stop generating contact transport streams when bandwidth runs out. However, because non-video contact transport streams are less time sensitive than video and can be delayed by short amounts of time without any noticeable effect, the contact transport stream assembly process may use non-video data delay as a mechanism for mitigating temporary link congestion. In contrast, an assembly process for a legacy transport stream must dynamically reduce the bandwidth consumption of a frame by maintaining resolution and frame rate, and sacrificing image quality.

Embodiments of the present invention need not utilize all available bandwidth. For example, embodiments of the present invention may filter contact records in a contact stream until the bandwidth allocated to the contact stream has been exhausted, or all contact records having priorities less than a minimum threshold priority have been filtered from the contact stream, whichever comes first. Therefore, if all contact records having priorities less than the minimum threshold priority have been filtered from the contact stream before the bandwidth allocated to the contact stream has been exhausted, then the contact stream will be streamed using less than the bandwidth allocated to the contact stream. One reason for and advantage of this feature of embodiments of the present invention is that excluding contacts having priorities not exceeding the minimum threshold priority from the contact stream, even if bandwidth is available to transmit such contacts, relieves the receiving human operator of the need to view or otherwise perceive and evaluate such contacts. In this way, embodiments of the present invention preserve and focus the attention of the human operator on high-priority contacts.

Figure 21:
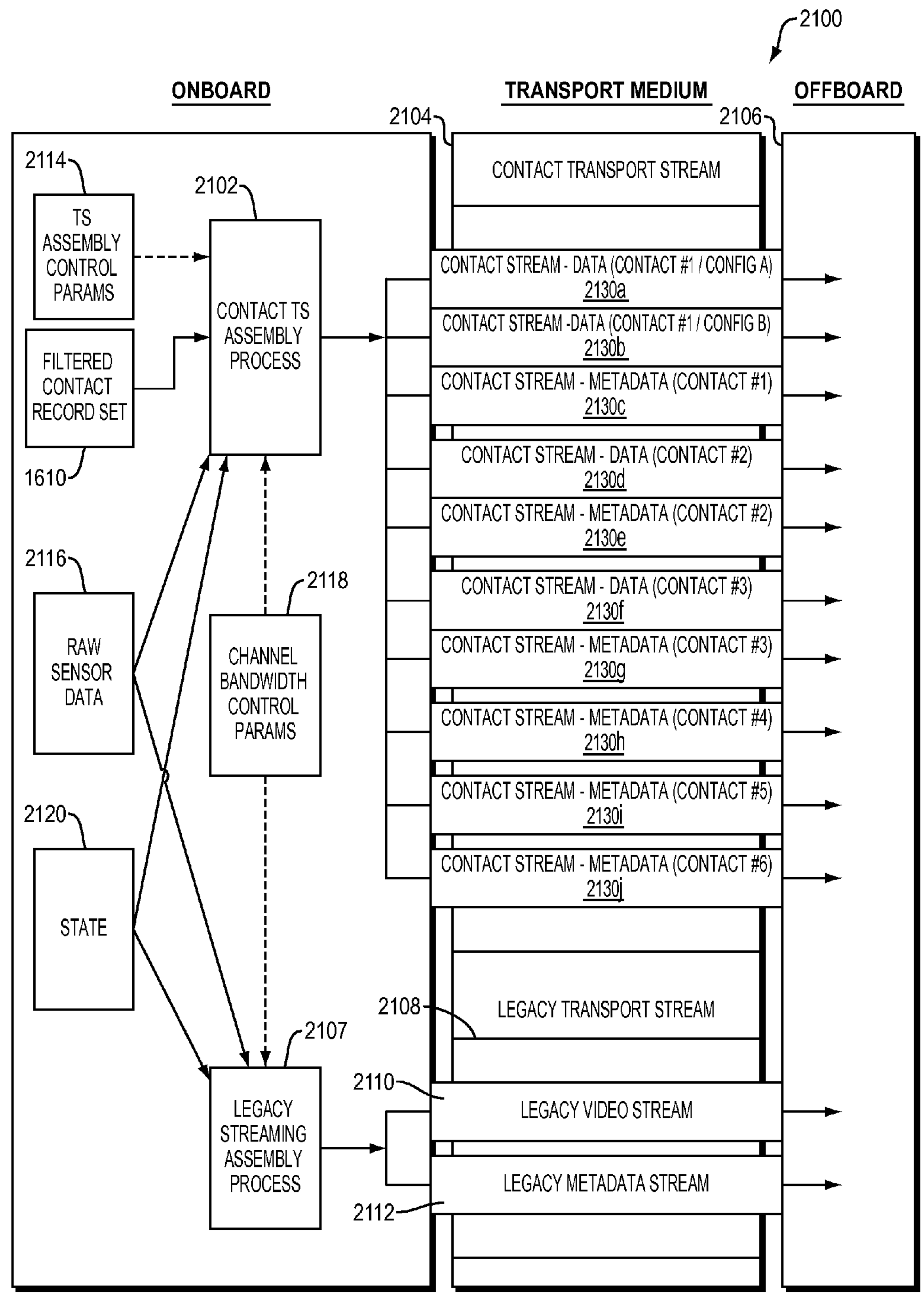
FIG. 21 shows an exemplary implementation of a system for assembling and streaming a contact transport stream according to one embodiment of the present invention.

FIG. 21 shows an example of one embodiment 2100 of the present invention, starting with the inputs to a contact transport stream assembly process 2102 and continuing through transport stream assembly onboard the agent, transmission of the assembled contact transport stream 2104 over the transport medium through parallel virtual pipes, and off-board arrival 2106. This example shows support for a legacy transport stream 2108 (containing, e.g., a legacy video stream 2110 and a legacy metadata stream 2112), produced by a legacy streaming assembly process 2107, such that the system 2100 of FIG. 21 can be made backwards compatible with existing systems through inclusion of legacy video 2110 and metadata streams 2112 according to (for example) STANAG 4609 and by implementing contact stream data and metadata packets as one or more custom locally defined streams (LDS). Although no known public custom LDS can implement contact streams as described herein, one skilled in the art may utilize an existing custom LDS such as those described in MISB EG 0601.1 and MISB EG 0801.1 as a reference in conjunction with the disclosure herein to implement a functioning prototype of embodiments of the present invention.

More specifically, the contact transport stream assembly process 2102 receives as input a contact record set (such as the filtered contact record set 1610), transport stream assembly control parameters 2114, raw sensor data 2116, channel bandwidth control parameters, and state data, and produces as output the contact transport stream 2104 based on the inputs to the contact transport stream assembly process 2102. The resulting contact transport stream 2104 may, for example, include multiple contact streams, each of which may include data and/or metadata. In the particular example of FIG. 21, the contact transport stream 2104 includes: (1) contact data stream 2130*a* for a first contact based on a first set of configuration parameters, contact data stream 2130*b* for the first contact based on a second set of configuration parameters, and contact metadata stream 2130*c* for the first contact; (2) contact data stream 2130*d* and contact metadata stream 2130*e* for a second contact; (3) contact data stream 2130*f* and contact metadata stream 2130*g* for the second contact; (4) contact metadata stream 2130*h* for a fourth contact; (5) contact metadata stream 2130*i* for a fifth contact; and (6) contact metadata stream 2130*j* for a sixth contact.

Various functions performed by embodiments of the present invention may be pipelined to obtain increased efficiency. For example, the assigning of priorities to contacts in a contact stream may be pipelined with production and/or streaming of the contact stream itself. As another example, production of a contact stream may be pipelined with streaming of the contact stream. As is well-known to those having ordinary skill in the art, "pipelining" two processes involves performing at least the beginning of one of the two processes before the other of the two processes has completed. One example of pipelining is performing a multi-step process on first and second units of data, where a first step of the process is performed on the first unit of data, and the first step of the process then performed on the second unit of data before or while the second step of the process is performed on the first unit of data. In this way, pipelining is more efficient that requiring all processing to be completed on the first unit of data before processing can begin on the second unit of data.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method for use with an identified contact record set, wherein the identified contact record set comprises an identification set, wherein the identification set comprises a plurality of contact records and, for each of the plurality of contact records, a corresponding identification that specifies identification type metadata for the contact record, the method comprising:

(A) applying a prioritization process to the identified contact record set, comprising:

(A)(1) assigning a contact priority to each of the plurality of contact records;

(B) producing a first contact stream based on the identified contact record set, comprising removing data from the identified contact record set based on the assigned contact priorities; and (C) streaming the first contact stream.

2. The method of claim 1, wherein (A) further comprises:

(A)(2) filtering the identified contact record set based on the assigned contact priorities to produce a filtered contact record set; and wherein (B) comprises producing the first contact stream based on the filtered contact record set, comprising removing data from the filtered contact record set based on the assigned contact priorities to produce the first contact stream.

3. The method of claim 2, wherein (A)(2) comprises removing, from the identified contact record set, contact records having an assigned priority that is less than a minimum threshold priority.

4. The method of claim 2, wherein (A)(2) comprises filtering the identified contact record set until bandwidth allocated to the first contact stream has been exhausted or all contact records in the identified contact record set having priorities less than a minimum threshold priority have been filtered from the first contact stream, whichever comes first.

5. The method of claim 1, wherein (A)(1) comprises assigning a contact priority to one of the plurality of contact records based on the amount of time the one of the plurality of contact records has been in the identified contact record set.

6. The method of claim 1, wherein (C) comprises streaming the first contact stream while performing (A)(1).

7. The method of claim 1, wherein (A)(1) and (B) are pipelined.

8. The method of claim 1, wherein (B) and (C) are pipelined.

9. The method of claim 1, wherein (A)(1) and (C) are pipelined.

10. The method of claim 9, wherein (A)(1), (B), and (C) are pipelined.

11. The method of claim 1, wherein (C) comprises streaming the first contact stream while performing (B).

12. The method of claim 11, wherein (C) comprises streaming the first contact stream while performing (A)(1).

13. The method of claim 1, further comprising:

(D) producing a contact transport stream comprising the first contact stream and a second contact stream; and (E) streaming the contact transport stream.

14. The method of claim 13, wherein (E) comprises varying bandwidth utilized by the first contact stream by altering the resolution of the first contact stream while streaming the contact transport stream.

15. The method of claim 14, wherein (E) further comprises altering at least one of the metadata content, metadata rate, frame rate, and image quality of the first contact stream while streaming the contact transport stream.

16. The method of claim 13, wherein the first contact stream has a frame rate of zero.

17. The method of claim 16, wherein the second contact stream has a frame rate of zero.

18. The method of claim 13, wherein the first contact stream has a metadata rate of zero.

19. The method of claim 1, further comprising:
(D) receiving user input specifying an updated contact priority for one of the plurality of contact records;
(E) assigning the updated contact priority to the one of the plurality of contact records; and
(F) updating the first contact stream based on the updated contact priority.

20. The method of claim 19, wherein (F) comprises updating the first contact stream while streaming the contact transport stream.

21. The method of claim 1, further comprising:
(D) receiving an updated control parameter;
(E) updating a contact priority of one of the plurality of contact records based on the updated control parameter; and
(F) updating the first contact stream based on the updated contact priority.

22. The method of claim 1, further comprising:
(D) before (A), applying an identification process to a classified contact record set to produce the identification set; and
(E) adding the identification set to a classified contact record set to produce the identified contact record set.

23. The method of claim 22, further comprising:
(H) before (A), applying a classification process to a detected contact record set to produce a classification set, wherein the classification set comprises a classification corresponding to each of the contact records in an initial contact record set, wherein the classification corresponding to a contact record specifies, for each of a plurality of classification categories, a derived class of the contact record in that category; and
(I) adding the classification set to the detected contact record set to produce the classified contact record set.

24. The method of claim 23, further comprising:
(J) before (A), receiving at least one raw data stream from at least one sensor, wherein the at least one raw data stream represents sensed quantities in an environment external to a device;
(K) applying a detection process to the at least one raw data stream to produce a detection set, wherein the detection set comprises at least one detection, wherein each detection in the detection set represents an object found by the detection process in a frame of the at least one raw data stream;
(L) applying a contact recognition process to the detection set to produce the initial contact record set, wherein the initial contact record set comprises at least one contact record, wherein each contact record in the contact record set represents a contact recognized by the contact recognition process in the detection set; and
(M) adding the detection set to the initial contact record set to produce the detected contact record set.

25. The method of claim 24, wherein (J) comprises receiving the at least one raw data stream from at least one sensor having a field-of-view.

26. The method of claim 25, wherein (J) comprises receiving the at least one raw data stream from at least one sensor not having a field-of-view.

27. The method of claim 1, wherein (B) comprises:
(B)(1) removing data from contact records in the identified contact record set; and
(B)(2) removing metadata from the identification set.

28. The method of claim 1, wherein (A)(1) comprises assigning a qualitative contact priority to at least one of the plurality of contact records.

29. The method of claim 1, wherein (A)(1) comprises assigning a quantitative contact priority to at least one of the plurality of contact records.

30. The method of claim 1, wherein at least two of the assigned contact priorities differ from each other.

31. A system for use with an identified contact record set,
wherein the identified contact record set comprises an identification set,
wherein the identification set comprises a plurality of contact records and, for each of the plurality of contact records, a corresponding identification that specifies identification type metadata for the contact record,
the system comprising:
at least one computer processor; and
at least one computer-readable medium executable by the at least one computer processor to perform a method,
the method comprising:
(A) applying a prioritization process to the identified contact record set, comprising:
(A)(1) assigning a contact priority to each of the plurality of contact records;
(B) producing a first contact stream based on the identified contact record set, comprising removing data from the identified contact record set based on the assigned contact priorities; and
(C) streaming the first contact stream.

32. The system of claim 31, wherein (A) further comprises:
(A)(2) filtering the identified contact record set based on the assigned contact priorities to produce a filtered contact record set; and
wherein (B) comprises producing the first contact stream based on the filtered contact record set, comprising removing data from the filtered contact record set based on the assigned contact priorities to produce the first contact stream.

33. The system of claim 32, wherein (A)(2) comprises removing, from the identified contact record set, contact records having an assigned priority that is less than a minimum threshold priority.

34. The system of claim 32, wherein (A)(2) comprises filtering the identified contact record set until bandwidth allocated to the first contact stream has been exhausted or all contact records in the identified contact record set having priorities less than a minimum threshold priority have been filtered from the first contact stream, whichever comes first.

35. The system of claim 31, wherein (A)(1) comprises assigning a contact priority to one of the plurality of contact records based on the amount of time the one of the plurality of contact records has been in the identified contact record set.

36. The system of claim 31, wherein (C) comprises streaming the first contact stream while performing (A)(1).

37. The system of claim 31, wherein (A)(1) and (B) are pipelined.

38. The system of claim 31, wherein (B) and (C) are pipelined.

39. The system of claim 31, wherein (A)(1) and (C) are pipelined.

40. The system of claim 39, wherein (A)(1), (B), and (C) are pipelined.

41. The system of claim 31, wherein (C) comprises streaming the first contact stream while performing (B).

42. The system of claim 41, wherein (C) comprises streaming the first contact stream while performing (A)(1).

43. The system of claim 31, wherein the method further comprises:

(D) producing a contact transport stream comprising the first contact stream and a second contact stream; and (E) streaming the contact transport stream.

44. The system of claim 43, wherein (E) comprises varying bandwidth utilized by the first contact stream by altering the resolution of the first contact stream while streaming the contact transport stream.

45. The system of claim 44, wherein (E) further comprises altering at least one of the metadata content, metadata rate, frame rate, and image quality of the first contact stream while streaming the contact transport stream.

46. The system of claim 43, wherein the first contact stream has a frame rate of zero.

47. The system of claim 46, wherein the second contact stream has a frame rate of zero.

48. The system of claim 43, wherein the first contact stream has a metadata rate of zero.

49. The system of claim 31, wherein the method further comprises:

(D) receiving user input specifying an updated contact priority for one of the plurality of contact records;

(E) assigning the updated contact priority to the one of the plurality of contact records; and (F) updating the first contact stream based on the updated contact priority.

50. The system of claim 49, wherein (F) comprises updating the first contact stream while streaming the contact transport stream.

51. The system of claim 31, wherein the method further comprises:

(D) receiving an updated control parameter;

(E) updating a contact priority of one of the plurality of contact records based on the updated control parameter; and (F) updating the first contact stream based on the updated contact priority.

52. The system of claim 31, wherein the method further comprises:

(D) before (A), applying an identification process to a classified contact record set to produce the identification set; and (E) adding the identification set to a classified contact record set to produce the identified contact record set.

53. The system of claim 52, wherein the method further comprises:

(H) before (A), applying a classification process to a detected contact record set to produce a classification set, wherein the classification set comprises a classification corresponding to each of the contact records in an initial contact record set, wherein the classification corresponding to a contact record specifies, for each of a plurality of classification categories, a derived class of the contact record in that category; and (I) adding the classification set to the detected contact record set to produce the classified contact record set.

54. The system of claim 53, wherein the method further comprises:

(J) before (A), receiving at least one raw data stream from at least one sensor, wherein the at least one raw data stream represents sensed quantities in an environment external to a device;

(K) applying a detection process to the at least one raw data stream to produce a detection set, wherein the detection set comprises at least one detection, wherein each detection in the detection set represents an object found by the detection process in a frame of the at least one raw data stream;

(L) applying a contact recognition process to the detection set to produce the initial contact record set, wherein the initial contact record set comprises at least one contact record, wherein each contact record in the contact record set represents a contact recognized by the contact recognition process in the detection set; and (M) adding the detection set to the initial contact record set to produce the detected contact record set.

55. The system of claim 54, wherein (J) comprises receiving the at least one raw data stream from at least one sensor having a field-of-view.

56. The system of claim 55, wherein (J) comprises receiving the at least one raw data stream from at least one sensor not having a field-of-view.

57. The system of claim 31, wherein (B) comprises:

(B)(1) removing data from contact records in the identified contact record set; and (B)(2) removing metadata from the identification set.

58. The system of claim 31, wherein (A)(1) comprises assigning a qualitative contact priority to at least one of the plurality of contact records.

59. The system of claim 31, wherein (A)(1) comprises assigning a quantitative contact priority to at least one of the plurality of contact records.

60. The system of claim 31, wherein at least two of the assigned contact priorities differ from each other.

61. A method for use with a classified contact record set, wherein the classified contact record set comprises a plurality of contact records and, for each of the plurality of contact records, a corresponding classification that specifies, for each of a plurality of classification categories, a derived class of the contact record in that category, the method comprising:

(A) applying a prioritization process to the classified contact record set, comprising:

(A)(1) assigning a contact priority to each of the plurality of contact records;

(B) producing a first contact stream based on the classified contact record set, comprising removing data from the classified contact record set based on the assigned contact priorities; and (C) streaming the first contact stream.

62. A system for use with a classified contact record set, wherein the classified contact record set comprises a plurality of contact records and, for each of the plurality of contact records, a corresponding classification that specifies, for each of a plurality of classification categories, a derived class of the contact record in that category, the system comprising:

at least one computer processor; and at least one computer-readable medium executable by the at least one computer processor to perform a method, the method comprising:

(A) applying a prioritization process to the classified contact record set, comprising:

(A)(1) assigning a contact priority to each of the plurality of contact records;

(B) producing a first contact stream based on the classified contact record set, comprising removing data from the classified contact record set based on the assigned contact priorities; and (C) streaming the first contact stream.

63. A method for use with a prioritized contact record set, wherein the prioritized contact record set comprises a plurality of contact records and, for each of the plurality of contact records, a corresponding identification that specifies identification type metadata for the contact record and a contact priority assigned to the contact record;

the method comprising:

(A) producing a first contact stream based on the prioritized contact record set, comprising removing data from the prioritized contact record set based on the contact priorities assigned to the plurality of contact records; and (B) streaming the first contact stream.

64. A system for use with a prioritized contact record set, wherein the prioritized contact record set comprises a plurality of contact records and, for each of the plurality of contact records, a corresponding identification that specifies identification type metadata for the contact record and a contact priority assigned to the contact record;

the system comprising:

at least one computer processor; and at least one computer-readable medium executable by the at least one computer processor to perform a method, the method comprising:

(A) producing a first contact stream based on the prioritized contact record set, comprising removing data from the prioritized contact record set based on the contact priorities assigned to the plurality of contact records; and (B) streaming the first contact stream.

* * * * *